United States Patent [19]

Arlt et al.

[11] Patent Number: 5,306,803
[45] Date of Patent: Apr. 26, 1994

[54] PROCESS FOR CLEANING THERMOPLASTS BY FRICTION COMPACTING

[75] Inventors: Wolfgang Arlt; Manfred Schmidt; Thomas Fischer; Ralf Lange, all of Krefeld, Fed. Rep. of Germany

[73] Assignee: Bayer Aktiengesellschaft, Fed. Rep. of Germany

[21] Appl. No.: 702,047

[22] Filed: May 17, 1991

[30] Foreign Application Priority Data

Jun. 2, 1990 [DE] Fed. Rep. of Germany ....... 4017830

[51] Int. Cl.$^5$ .............................................. C08F 6/00
[52] U.S. Cl. .................................... 528/480; 528/500; 528/501; 528/502
[58] Field of Search ................ 528/500, 501, 502, 480

[56] References Cited

FOREIGN PATENT DOCUMENTS 0175968 4/1986 European Pat. Off. .
0287948 10/1988 European Pat. Off. .
3713669 11/1988 Fed. Rep. of Germany .

*Primary Examiner*—John Kight, III
*Assistant Examiner*—Shelley A. Dodson
*Attorney, Agent, or Firm*—Connolly & Hutz

[57] ABSTRACT

A process for cleaning thermoplasts is described. The thermoplast to be cleaned is introduced between the discs of a plast compactor and substantially freed from unwanted residues from the polymerization process by the force and rise in temperature produced by the movement of rotation.

3 Claims, No Drawings

PROCESS FOR CLEANING THERMOPLASTS BY FRICTION COMPACTING

This invention relates to a process for the removal of ash forming impurities, residues of solvent, water, etc. from a thermoplast.

The background to the invention is the fact that many thermoplasts, in particular polyarylene sulphide (hereinafter referred to as PPS) and polycarbonates must be freed from unwanted residues after polymerisation. These residues may consist in particular of residues of monomers, solvent residues, water and other residues which together are described as ash forming.

Processes for the cleaning of thermoplasts, in particular polyarylene sulphides, are known. Thus, for example, a process for cleaning polyarylene sulphides is described in DE-37 13 669-A1. In the described process, the polyarylene sulphides are freed from moisture mechanically by pressure belts or high pressure rollers. When the moisture is squeezed out, the proportion of ash forming impurities is also greatly reduced. The solids content of the PPS is at the same time increased to 50-95% and the ash forming impurities decrease to below 0.05%.

PPS which has been cleaned contains less ash forming impurities and splits off a smaller amount of volatile compounds when processed and therefore causes less corrosion of the apparatus used for its processing. Further, impurities left in the PPS may interfere with the use of polyarylene sulphides for electrical parts.

Friction compactors used in the new process are known as plast compactors in the field of regranulation. They are used for converting synthetic resin waste into granulates which can be reprocessed.

It is an object of the present invention to develop a process which enables freshly polymerised thermoplasts to be freed from unwanted residues by simple means.

To solve this problem, the thermoplast which is to be cleaned is introduced between two discs which rotate relatively to one another and the above-mentioned residues are separated from the thermoplast by the forces acting on the thermoplast as a result of the rotation.

It has been found that polymers containing a high proportion of residues such as are obtained directly after polymerisation can be substantially freed from ash forming impurities, residual moisture or process specific solvents under quite mild conditions, i.e. without undue exposure to heat, by using a plast compactor of known construction. The forces acting in the process of rotation bring about various processes in the substance introduced. The thermoplast becomes finely divided and is heated to such an extent by the friction that unwanted components evaporate, and thirdly, the surface of the product melts so that little or no dust is produced.

The centrifugal force ensures separation of the liquid components of the polymer and carries the material introduced out of the plast compactor.

In order to convert the motor power particularly advantageously into effective heat, it is necessary to influence the friction accordingly. This is advantageously achieved by suitably adjusting the distance between the discs, by rapid rotation of the discs and by surface structuring of the discs.

The distance between the discs is preferably from 1 mm to 5 mm, in particular from 2 mm to 4 mm, measured at the outer edge of the discs.

The frequency of rotation is preferably from 8 sec$^{-1}$ to 83 sec$^{-1}$.

The surface of at least one disc, preferably of both discs, should be so designed for each product that after the machine has been switched off the discs are found to have a stellate structure on their surface with the centre of the star coinciding with the centre of the discs and with preferably 4 to 20 strands of product radiating to the outer edge of the discs like the beams of a star. If the number of product strands is less than 4, the heat to which the product is subjected increases, while with product strands above 20 the time of stay of the material between the discs is too long. Cooling of the discs is sometimes necessary if the polymers are particularly sensitive.

Another preferred method of carrying out the process is characterised in that the unclean thermoplasts are introduced through a hole in one of the discs by means of a screw conveyor, the sense of rotation of the screw conveyor being opposite to that of the pair of discs.

The use of a screw conveyor for introducing the thermoplast through a central opening in the stator disc of the plast compactor provides a very simple means of enabling the cleaning process to be carried out continuously. It was found that the process is particularly advantageous to carry out if the sense of rotation of the screw conveyor and that of the rotor disc are opposite to one another.

This process is particularly advantageous for cleaning high temperature resistant thermoplasts. High temperature resistant thermoplasts are thermoplasts which can still be processed by injection moulding at temperatures above 280° C. The process is suitable in particular for cleaning polyarylene sulphides, in particular polyphenylene sulphides, and polycarbonates.

Branched or unbranched PPS has been disclosed in, for example, U.S. Pat No. 3,354,129 and EP-A 171 021, and linear or straight chained polycarbonates are known from, for example, U.S. Pat. Nos. 3,028,365, 3,275,601 and German Offenlegungsschrift 38 32 396.

The new process is described below with the aid of two examples. A detailed description of the plast compactor and of a granulation apparatus with return is not given.

In the 'Condux' system of compaction the shredded material passes through a continously operated disc kneader where, in a matter of seconds, it is sintered by friction and mechanical pressure. The pressure and heat of friction are so adjusted that sintering takes place in the border zone of the disc compactor. Immediately afterwards the irregular strands of the formed mass are thrown off by centrifugal force, caught up in a cold air stream from a fan located behind and are simultaneously cooled and transported.

The different polymers require the use of the appropriate compacting plant. In the reclaiming of PE, PS and PVC and disc compactor in which only the stationary discs are equipped for water cooling are sufficient. With polyamides, polyesters, and other thermoplastics having a high melting range, additional cooling of the rotary compactor discs by means of a hollow shaft is necessary.

The waste must next be shredded in a cutting mill. The shredded fibre or foam material coming from the cutting mill is conveyed pneumatically into an intermediate bunker, whose filling can be inspected through a sight glass. Under this small bunker a screw conveyor transports the shredded material to the compactor proper, which unit is a further development of the tooth disc mill. Above the screw conveyor runs, from the same regulated drive, a stirring mechanism to prevent any bridging of the material in the adjuster.

A high pressure suction fan passes the compacted mass through the piping and a cyclone separator to the cutting mill. Here, a cubical granulate is produced whose grain size is determined by the size of the internal mesh apertures.

A further medium-pressure suction fan passes the granulate via a cylcone separator to the filling station. This is equipped with a rising tube separator. The heavy plastic granules fall into an open vessel beneath. A current of air, regulated by a throttle valve, carries any incompletely compacted fibre and film waste back into the cycle for reprocessing. This is particularly important in the first 20–30s of the start-up of the installation. This time span is necessary for heating up the two discs in the compactor to working temperature. Temperature conditions are then maintained constant during operation. Care must be taken that the granules are cooled to around room temperature.

For the reclamation of side strip cuttings from flat and blown film units, manual handling can be replaced by continuously drawing off the strip through a cutting mill, after which the shredded material is conveyed by suction to the bunker.

Two different sizes of compactors are on the market, CV 30 and CV 50 having throughputs of approximately 140 and 450 kg/h respectively of polyethylene film scrap.

The installation used for cleaning the polymers is substantially identical to installations used for the working up thermoplastic synthetic resin waste followed by granulation. Such an installation has been disclosed, for example, in Chemistry and Industry (London), (12), (1973), 559–61, i.e. a "Condux" system of compaction and a cutting mill.

The use of a granulating installation with return has the advantage that the polymer can be worked up into a granulate after it has been cleaned. The return device enables a uniform grain size to be produced and guarantees virtual freedom from dust.

Comparison examples may be found in the above mentioned DE-37 13 669-A1.

These Comparison Examples, which can also be compared with the Examples of the present invention, are numbered I through IV and are set forth below.

Preparation of Polyphenylene Sulfide By A Known Method (e.g. DE-OS 34 28 984)

1110 g of N-methylcaprolactam, 325.5 g of sodium sulphide hydrate (=2.45 mol Na$_2$S), 2.4 g of 50% sodium hydroxide solution, 341.1 g of 1,4-dichlorobenzene (=2.32 mol), 28.53 g of sodium acetate and 5.07 g of $\epsilon$-aminocaproic acid (0.035 mol) are introduced under nitrogen into a 2 l three-necked flask equipped with a thermometer, a stirrer and a column with distillate divider. The reaction mixture is slowly heated to boiling. Water is separated from the azeotropic mixture of water and p-dichlorobenzene distilling off and the p-dichlorobenzene is returned to the reaction vessel. No more water can be detected either in the distillate or in the sump after 2 hours. Heating is continued under reflux for a further 9 hours.

The reaction mixture is then introduced into 1 l of isopropanol with vigorous stirring. The precipitated product is washed four times with four times its quantity of precipitating agent and then washed free from electolyte with water to remove residues of inorganic salts (conductivity of wash water below 10 $\mu$S corresponding to a sodium chloride content of less than 5 ppm).

EXAMPLE I

Drying at elevated temperature in a vacuum as comparison example

A polyarylene sulphide having a solids content of 18% and obtained, for example, by the method described above, is dried in a drying cupboard under a vacuum of 10 mbar at 140° C. for 12 hours. The quantity of ash-forming impurities is then determined (see Table).

EXAMPLE II

Separation of PPS by centrifuging as comparison example

A polyphenylene sulphide as described in Example I is introduced into a centrifuge and centrifuged for 5 minutes during which it is subjected to a pressure of about 20 bar. The results are shown in the Table.

EXAMPLE III

Drying on rollers as comparison example

Example II is repeated but a pressure belt is used instead of the centrifuge. An increasing pressure finally reaching approximately 80 bar is applied to the product between three pairs of rollers while the two belts both move at the same velocity. The results are shown in the Table.

EXAMPLE IV

Drying on high pressure rollers as comparison example

Example II is repeated but a pair of high pressure rollers is used instead of the centrifuges, and a pressure of about 200 bar is applied to the product. The surfaces of the rollers are smooth.

TABLE

| Example | Solids content after mechanical dewatering (%) | Content in ash-forming impurities (% based on PPS) |
|---|---|---|
| I (Comparison) | 18 | 0.75 |
| II (Comparison) | 55 | 0.21 |
| III (Comparison) | 63 | 0.16 |
| IV (Comparison) | 90 | 0.11 |

EXAMPLE 1

Moist polyarylene sulphide having a residual moisture content of 45% (water, aromatic and chlorinated aromatic by-products derived from the process) was conveyed to the friction compactor.

| Machine parameters: | |
|---|---|
| Diameter of discs: | 300 mm |
| Surface of discs: | structured |
| Distance between discs: | 2 mm (at the outer circumference) |
| Speed of rotation of the discs: | 500 min$^{-1}$ |
| Process parameters: | |
| Throughput: | 120 kg/h |
| Return ratio: | 1 |
| Product parameters: | |

-continued

| | |
|---|---|
| Residual moisture: | 0.45% |
| Monomer content before (p-dichlorobenzene): | 1,100 ppm |
| Monomer content after: | 310 ppm |

The powder obtained could be subjected to a conventional treatment in vacuum screw machines as well as to direct compounding with other contents to produce a product ready for sale.

EXAMPLE 2

Moist polycarbonate powder (10% water, 1.4% n-heptane, 0.15% dichloromethane) was conveyed to the friction compactor.

| | |
|---|---|
| Substance parameters: | |
| Weight average molecular weight $M_w$ of the PC powder: | 26690 |
| Number average molecular weight $M_n$ of the PC powder: | 12470 |
| Bulk density: | 520 g/l |
| Relative solution viscosity (determined at 25° C. in dichloromethane at a concentration of 0.5% by weight) | 1.268 |
| Machine parameters: | |
| Diameter of discs: | 45 cm |
| Surface of discs: | structured in the form of linear rays |
| Distance between discs: | 3 mm (at the outer edge) |
| Speed of rotation: | 500 min$^{-1}$ |
| Process parameter: | |
| Rate of throughput: | 100 kg/h |
| Product parameters: | |
| Water content: | 0.01% by weight |
| Solvent content: | 0.28% n-heptane 0.04% dichloromethane |
| Bulk density: | 400 g/l |
| Relative solution viscosity: | 1.267. |

The contact time of the polycarbonate between the pair of discs of the apparatus was about 1/10 sec. During this time, the temperature of the polycarbonate rose for a short time to the glass transition temperature $T_G$ of 148° C. The polycarbonate substantially freed from water and residual solvents under mild conditions by this process according to the invention was then extruded to form a granulate in a vacuum extruder (Model ZSK 58, Manufacturer: Werner & Pfleiderer, Stuttgart, West Germany). A polycarbonate having the following product characteristics is obtained:

| | |
|---|---|
| Relative viscosity: | 1.267 |
| Water content: | 0.01% by weight |
| Solvent content: | 10 ppm n-heptane, <2 ppm dichloromethane |
| Sodium ions: | <1 ppm |
| Chlorine ions: | <2 ppm |
| Weight average molecular weight $M_w$ of the PC granulate: | 26670 |
| Number average molecular weight $M_n$ of the PC granulate: | 13080 |

We claim:

1. A process for the removal of residues in the form of ash-forming impurities, residual solvents and water from a thermoplast, comprising the following steps:
   introducing a thermoplast between two discs rotating relative to one another, the frequency of rotation of the discs ranging from about 8 sec$^{-1}$ to about 83 sec$^{-1}$, said introducing step being carried out by conveying the thermoplast with a screw conveyor to and through a hole in one of the discs, and rotating the screw conveyor opposite to the direction of relative rotation of the discs,
   the distance between the discs being from 1 mm to 5 mm,
   separating the residues from the thermoplast by the forces acting on the thermoplast as a result of the rotation, and
   removing the processed thermoplast from the outer edges of the discs.

2. A process as in claim 1, wherein the thermoplast is a high temperature resistant thermoplast.

3. A process as in claim 2, wherein the thermoplast is a polyarylene sulphide or a polycarbonate.

* * * * *